United States Patent
Branch

(10) Patent No.: US 8,641,899 B2
(45) Date of Patent: Feb. 4, 2014

(54) METHOD AND APPARATUS FOR REMOVING METAL CUTTINGS FROM AN OIL WELL DRILLING MUD STREAM

(75) Inventor: James A. Branch, Fort Worth, TX (US)

(73) Assignee: Petroleum Specialty Rental, LLC, Morgan City, LA (US)

( * ) Notice: Subject to any disclaimer, the term of this patent is extended or adjusted under 35 U.S.C. 154(b) by 1238 days.

(21) Appl. No.: 12/117,045

(22) Filed: May 8, 2008

(65) Prior Publication Data
US 2009/0218145 A1    Sep. 3, 2009

Related U.S. Application Data

(60) Provisional application No. 60/916,977, filed on May 9, 2007.

(51) Int. Cl.
  *E21B 21/06*    (2006.01)
  *B03C 1/02*    (2006.01)
  *B01D 35/06*    (2006.01)

(52) U.S. Cl.
  USPC ........... 210/222; 210/695; 209/223.1; 175/66

(58) Field of Classification Search
  USPC ................... 210/222, 695; 209/223.1; 175/66
  See application file for complete search history.

(56) References Cited

U.S. PATENT DOCUMENTS

| | | | |
|---|---|---|---|
| 2,792,115 A | 5/1957 | Medearis | |
| 3,498,455 A | 3/1970 | Kirby, III | |
| 3,713,499 A | 1/1973 | Arscott et al. | |
| 4,030,558 A | 6/1977 | Morris | |
| 5,188,239 A * | 2/1993 | Stowe | 210/222 |
| 5,944,195 A | 8/1999 | Huang et al. | |
| 6,354,386 B1 | 3/2002 | Ruttley | |
| 6,706,178 B2 * | 3/2004 | Simonson | 210/222 |
| 2006/0016732 A1 | 1/2006 | Franzreb et al. | |
| 2007/0138103 A1 | 6/2007 | Klatt | |

* cited by examiner

*Primary Examiner* — David A Reifsnyder
(74) *Attorney, Agent, or Firm* — Garvey, Smith, Nehrbass & North, L.L.C.; Charles C. Garvey, Jr.; Vanessa M. D'Souza

(57) ABSTRACT

An improved method and apparatus for removing metal cuttings from an oil well drilling mud stream provides a magnetic body or "ditch magnet" having end plates that extend radially and circumferentially from the magnetic body, the plates being positioned at end portions of the magnetic body. A third plate in the form of a wiper is used to dislodge metal cuttings and other metallic material from the magnetic body after the magnetic body has accumulated such metallic parts. One of the end plates can be removable to facilitate a complete scraping or wiping of the metallic parts from the metallic body by the wiper plate.

23 Claims, 4 Drawing Sheets

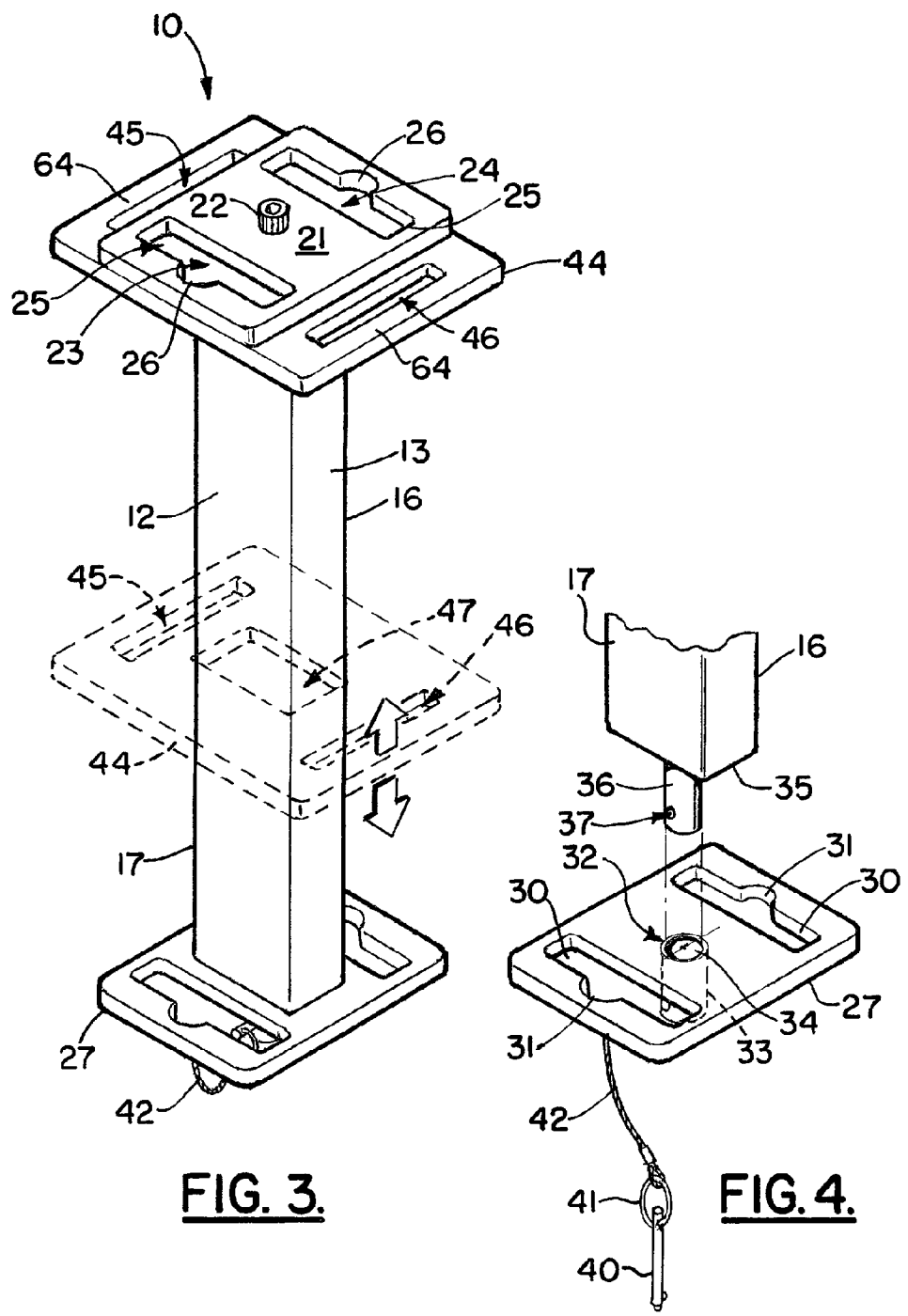

METHOD AND APPARATUS FOR REMOVING METAL CUTTINGS FROM AN OIL WELL DRILLING MUD STREAM

CROSS-REFERENCE TO RELATED APPLICATIONS

Priority of U.S. Provisional Patent Application Ser. No. 60/916,977, filed May 9, 2007, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to magnets that are used to remove metal cuttings, metal shavings, metal parts, and like metallic material from a flow stream of oil well drilling mud. More particularly, the present invention relates to an improved method and apparatus for removing metal cuttings, metal shavings, metal parts and the like from an oil well drilling mud flow stream wherein a magnetized bar has first and second end portions, each carrying an end plate and wherein a non-magnetic wiper plate attaches to the magnetized bar in between the end plates, the wiper plate being slidable upon the magnetized bar between the end plateS so that movement of the wiper plate from one end plate to the other end plate enables removal of the metal cuttings from the magnetized bar.

2. General Background of the Invention

Magnets have been used to remove metal from a flow stream of oil well drilling mud. Examples of commercially available magnets can be seen at the Stacey Oil Services, Ltd. website (www.staceyoil.com) and the Ceesan website (www-.ceesan.net). Such magnets are also known in the industry as "ditch magnets". Some patents have issued for ditch magnets. One such patent is U.S. Pat. No. 3,498,455. Other possibly relevant patents are listed chronologically in the following table.

TABLE

| Pat. No. | TITLE | ISSUE DATE |
| --- | --- | --- |
| 2,792,115 | Magnetic Separator | May 14, 1957 |
| 3,498,455 | Ditch Magnet | Mar. 30, 1970 |
| 3,713,499 | Method and Apparatus for Treating Drilling Mud | Jan. 30, 1973 |
| 4,030,558 | Wear Determination of Drilling Bits | Jun. 21, 1977 |
| 5,944,195 | Method for Separation of Solids from Drilling Fluids by Magnetic Separation and Centrifugation | Aug. 31, 1999 |
| 6,354,386 | Apparatus for Retrieving Metal Objects from a Wellbore | Mar. 12, 2002 |
| 2006/0016732 | High Gradient Magnetic Separator | Jan. 26, 2006 |
| 2007/0138103 | Magnetic Separation in Fluids | Jun. 21, 2007 |

Many of the metal parts that are collected by the ditch magnet are pieces that have been cut or shaved and are thus of irregular shape and can have jagged edges, sharp points, or the like. Safety is very important and meaningful in the oil and gas industry today. Cuttings that are collected by a ditch magnet can include sharp edged debris that could possibly cut the hand of a worker who handles the ditch magnet.

Cuttings that have been retrieved from a ditch magnet can provide information that is beneficial to oil and gas well operators. These collected cuttings may indicate casing wear during ordinary drilling operations, pipe wear, or any other factor which may be economically detrimental to the well or production.

Time is an important factor in oil and gas well drilling. The cost of drilling is rising. With drilling, rig rates as expensive as they are, a small part of time saved can equate to significant savings. Oil and gas well drilling rates can be as high as $125,000 to $600,000 per day. Thus, any procedure or apparatus that shortens the time for handling the ditch magnet and/or its debris can be a significant savings in money.

BRIEF SUMMARY OF THE INVENTION

The apparatus of the present invention provides an improved "ditch magnet" wherein a wiper flange of special configuration moves longitudinally along to wipe off metal cuttings that have become adhered to the magnet as it is immersed in a mass (e.g. flowing) of drilling mud. The present invention is safe to use because the wiper engages and wipes cuttings from the magnet. Because such cuttings can be sharp, pointed or jagged, injury to a worker can be avoided.

Because cuttings can be wiped into a container (such as the very shipping container used to carry the ditch magnet), they can be analyzed to determine their source (e.g. scrapings from casing, broken part, etc.)

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a perspective view of the preferred embodiment of the apparatus of the present invention;

FIG. 4 is a fragmentary perspective view of the preferred embodiment of the apparatus of the present invention;

DETAILED DESCRIPTION OF THE INVENTION

Figure 1:
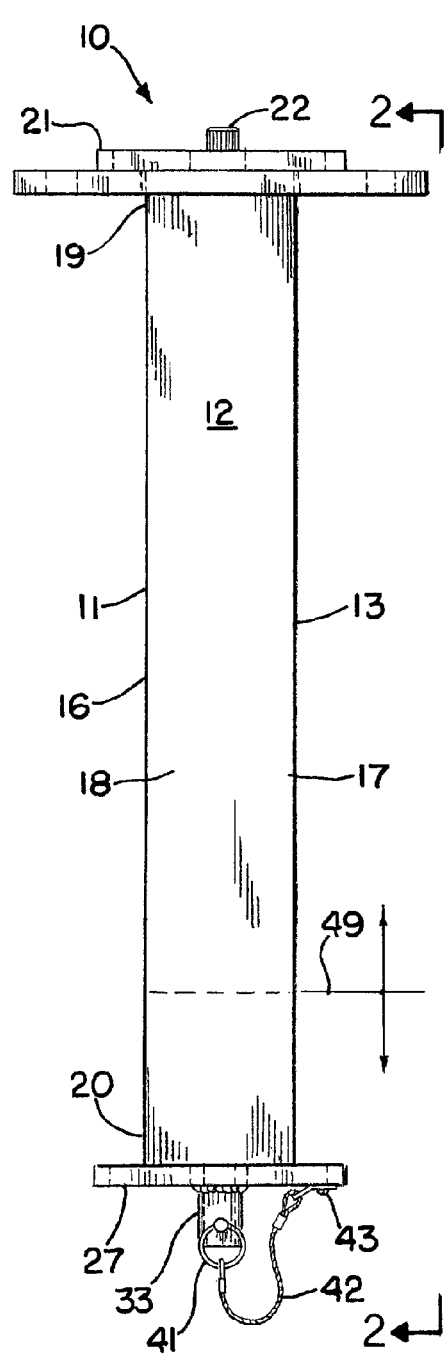
FIG. 1 is an elevation view of the preferred embodiment of the apparatus of the present invention.

FIGS. 1-8 show the preferred embodiment of the apparatus of the present invention designated generally by the numeral 10 in FIGS. 1-3 and 5-7. In the drawings, the numeral 10 shows an apparatus for removing metal from drilling mud, which apparatus 10 can also be referred to as a "ditch magnet".

Figure 8:
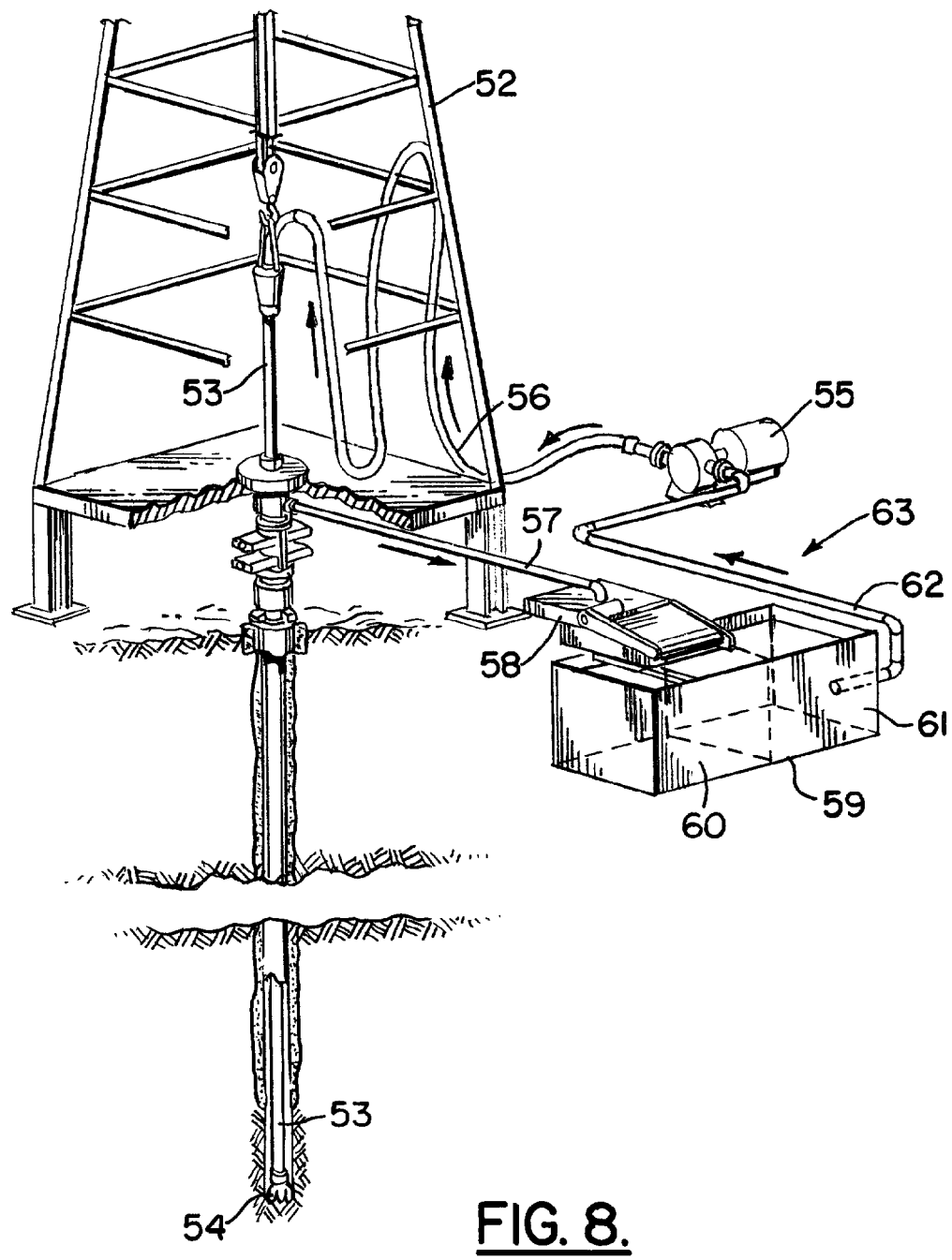
FIG. 8 is a schematic diagram illustrating part of the method of the present invention.

The apparatus 10 is typically placed in a flow stream of drilling mud such as in the flow stream 63 shown in FIG. 8. Such a flow stream 63 can be any part of the structure of an oil and gas well drilling platform that utilizes drilling mud. One location that could be used as flow stream 63 for placement of the apparatus 10 is a vessel associated with oil and gas well drilling that is commonly referred to as "the ditch" or the "possum belly" section 60. The apparatus 10 could also be placed in a pipeline or other flow stream that conveys drilling mud to shale shakers or other solids removal equipment that might be employed as part of the oil and gas well drilling mud system.

Figure 5:
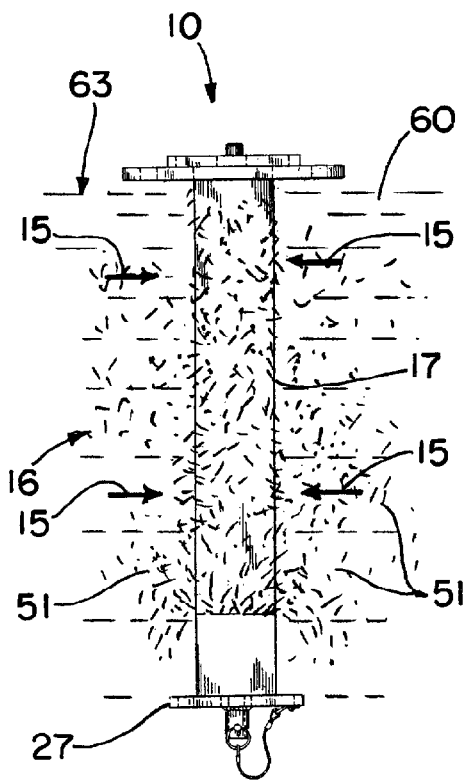
FIG. 5 is a side view of the preferred embodiment of the apparatus of the present invention and showing part of the method of the present invention.

Over a period of time, a magnetic body 17 of apparatus 10 will attract metallic objects or material 51 that is flowing in the drilling mud stream (see arrows 15 in FIG. 5). This metallic material can be cuttings, shavings, broken metal parts or the like. These unwanted metallic materials are generated as a part of oil and gas well drilling operation, fishing operation, milling operation, and/or completion operation. Such parts are at times lost in the well, or can be cut or shaved from casing or tubing as part of well drilling operations.

In FIG. 8 there is shown schematically the various components of an oil and gas well drilling rig. The drilling rig includes a derrick 52 that supports a drill string 53. At the lower end portion of the drill string 53 there is provided a drill bit 54. The drill bit 54 cuts formation material which enters a drilling mud stream.

The drilling mud is pumped into the well via a discharge flow line 56 using a discharge or mud pump 55. At the drill bit, the drilling mud collects drill cuttings and conveys them back to the surface. At the surface, a return flow line 57 carries the drilling mud and cuttings to a shale shaker 58.

The shale shaker 58 removes solid material such as the rock cuttings that are cut by the drill bit 54. Drilling mud then enters tank or vessel 59 that can have multiple sections such as a possum belly section 60 and a suction pit section 61. Suction line 62 communicates between tank 59 and pump 55. The apparatus 10 of the present invention can be placed at any number of locations in the schematic diagram of FIGS. 5 and 8 such as for example in possum belly 60, in suction pit 61 or in other locations where drilling mud flows or is contained.

A shipping container can be used to transport apparatus 10. Such a container provides an interior having a lid or cover. The lid or cover can be attached to the shipping container using a hinge and latch.

Magnet assembly 16 provides an elongated magnet body 17 having a plurality of sides 11, 12, 13, 14. Each of the sides 11-14 can be, for example, rectangular in shape. Magnet 17 provides end portions 19, 20. Plate 21 is attached to magnet 17 at end portion 19. This attachment can be for example a bolted connection, using a bolt 22 or other like fastener that connects to an internally threaded opening in the upper end portion 19 of magnet body 17. Magnet body 17 can be an assembly that includes an outer hollow shell (e.g. stainless steel) and one or more magnets housing inside the shell. Magnet or magnets contained internally of such a hollow shell could extend between end portion 19 and reference line 49. Thus no magnets would extend between reference line 49 and end portion 20.

Plate 21 can provide spaced apart openings 23, 24 as shown in FIG. 3. Each opening 23, 24 can include a rectangular section 25 and a semi-circular section 26. The semi-circular section 26 enables a rope, cable, chain, or other connector to form a connection with plate 21 at opening 23 or 24. Such opening 23 or 24 can be employed when the ditch magnet 10 is to be suspended from a rope, cable, chain, hook, or the like.

Openings 23, 24 also enable a technician 50 to grip and lift ditch magnet 10 at plates 21, 27 when transporting the ditch magnet 10 from one location to another, or when removing it from its shipping container, or when placing it into a shipping container.

Plate 27 is a plate that is removable from magnet body 17 using a disconnectable, quick release or detachable connection. The plate 27 can be disconnectable from magnet 17 in a minimum of time so that its removal will facilitate the removal of any metal shavings, metal cuttings, metal parts, or other metallic objects 51 that are affixed to the outer surface or sides 18 of magnet body 17. The plate 27 provides openings 28, 29. Each of the openings 28, 29 has a generally rectangular section 30 and a semi-circular section 31 as with plate 21.

Plate 27 provides a central opening 32. Sleeve 33 is connected (for example, welded) to plate 27 at central opening 32. Sleeve 33 provides sleeve bore 34 that is generally aligned with central opening 32 as shown.

Figure 2:
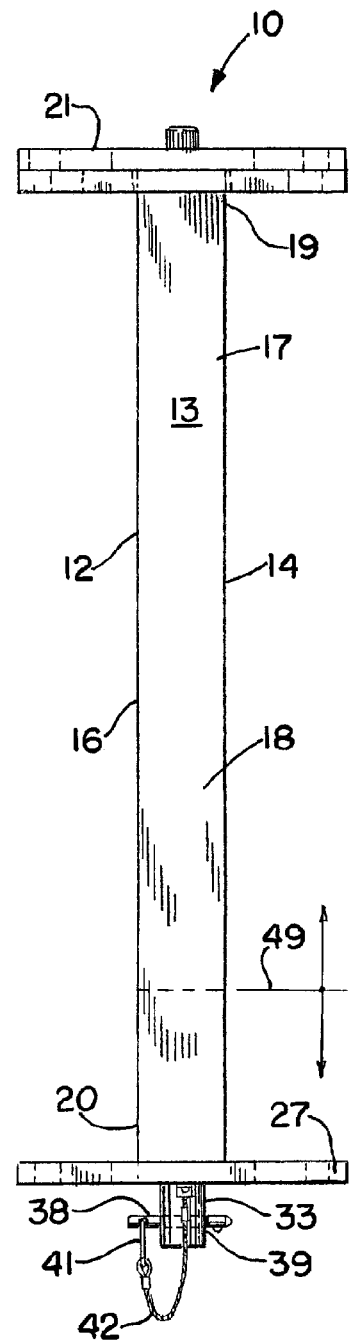
FIG. 2 is a side view of the preferred embodiment of the apparatus of the present invention taken along lines 2-2 of FIG. 1.

In FIGS. 4-7, magnet body 17 provides end surface 35 fitted with pin 36. Pin 36 provides a pin opening or channel 37 that is receptive of a locking pin 40. Upon assembly of plate 27 to magnet body 17 at pin 36, sleeve openings 38, 39 align with pin opening or channel 37. In this fashion, locking pin 40 can pass through each of the openings or channels 37, 38, 39 to form a locking connection between the sleeve 33 and pin 36 as shown in FIGS. 1-2. Locking pin 40 can be attached to plate 27 using a ring 41, tether 42 and fastener 43.

Wiper plate 44 is preferably a non-metallic plate, being constructed for example of polymeric material, plastic material, or other like material. Wiper plate 44 is preferably non-metallic. Plate 44 provides openings 45, 46 as well as central opening 47. The central opening 47 is of a size and shape that conforms to the transverse cross-section of magnet body 17 as shown in FIGS. 2, 3 and 4.

Figure 6:
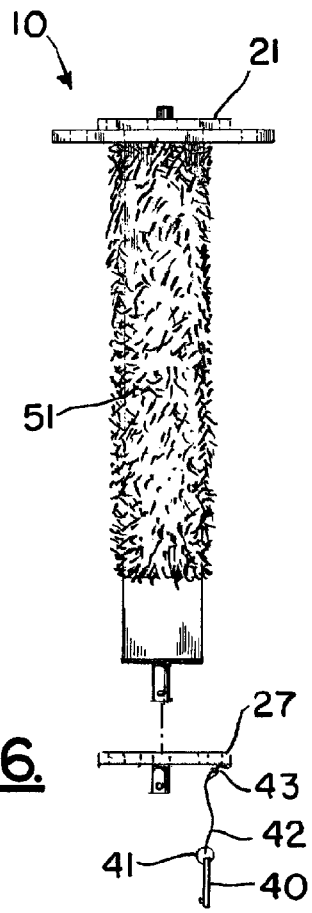
FIG. 6 is a side view of the preferred embodiment of the apparatus of the present invention and showing part of the method of the present invention.
Figure 7:
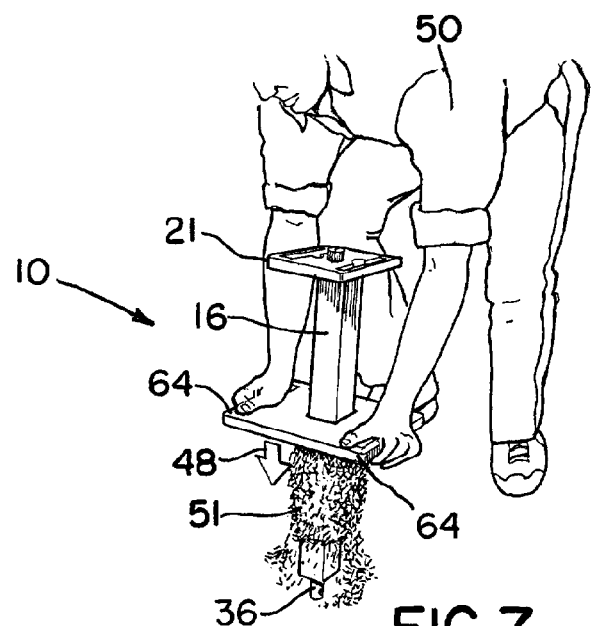
FIG. 7 is a perspective view of the preferred embodiment of the apparatus of the present invention and showing part of the method of the present invention.

FIGS. 5-7 illustrate a removal of cuttings, metallic shavings, metal parts or like metal objects 51 from magnet 17 using wiper plate 44. In FIG. 7, a technician 50 places ditch magnet 10 on a suitable surface or into a container. As shown in FIG. 7, a user 50 can grip and manipulate the assembly 16 of magnet 17 and wiper plate 27. Openings 45, 46 in FIG. 7 enable user 50 to grip plate, the area next to the openings 45, 46 thus providing handles 64. The technician 50 grips the handles 64 as shown in FIG. 7 and moves wiper plate 44 in a direction indicated by arrow 48 from a beginning position next to plate 21 downwardly toward end 20.

The technician removes locking pin 40 so that plate 27 can be separated from magnet 17. As indicated by the reference line 49, the part of magnet 17 in between reference line 49 and plate 27 is preferably not magnetized. When wiper plate 44 has pushed downwardly toward plate 27, metal objects, cuttings, shavings, parts or the like that reach reference line 49 will no longer be subjected to a magnetic field and will fall from magnet body 17 to a floor or other surface or into a container.

Removed metallic material 51 can either be saved for later analysis and/or properly disposed of.

The following is a list of parts and materials suitable for use in the present invention.

PARTS LIST

| Part Number | Description |
|---|---|
| 10 | apparatus for removing metal from drilling mud |
| 11 | side |
| 12 | side |
| 13 | side |
| 14 | side |
| 15 | arrow |
| 16 | magnet assembly |
| 17 | magnet body |
| 18 | side |
| 19 | end portion |
| 20 | end portion |
| 21 | plate |
| 22 | bolt/fastener |
| 23 | opening |
| 24 | opening |
| 25 | rectangular section |
| 26 | semi-circular section |
| 27 | plate |
| 28 | opening |
| 29 | opening |
| 30 | rectangular section |
| 31 | semi-circular section |
| 32 | central opening |
| 33 | sleeve |
| 34 | sleeve bore |
| 35 | end surface |
| 36 | pin |
| 37 | pin opening/channel |
| 38 | sleeve opening |
| 39 | sleeve opening |
| 40 | locking pin |
| 41 | ring |
| 42 | tether |
| 43 | fastener |
| 44 | wiper plate |
| 45 | opening |
| 46 | opening |
| 47 | central opening |
| 48 | arrow |
| 49 | reference line |
| 50 | technician |
| 51 | metal cuttings/shavings/parts/objects |
| 52 | derrick |
| 53 | drill string |
| 54 | drill bit |
| 55 | pump |
| 56 | flow line |
| 57 | flow line |
| 58 | shale shaker |
| 59 | tank/vessel |
| 60 | possum belly section |
| 61 | pit section |
| 62 | suction line |
| 63 | flow stream |
| 64 | handle |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. Apparatus for removing metal cuttings from a flowing liquid stream of oil well drilling mud, comprising:
   a) a bar having a first end portion that is a magnetic section, a second end portion that is a non-magnetic section, an outer surface, and wherein said bar has a generally uniform cross section;
   b) a first end plate attached to one end portion and having a peripheral portion extending radially away from the bar;
   c) a second end plated attached to the second end of the magnetized bar with a connection that enables the second end plate to be quickly disconnected from the bar, the second end plate having a peripheral portion extending radially away from the bar;
   d) a non-magnetic wiper plate having an opening that closely conforms to the outer surface of the bar, the wiper plate and bar defining an assembly, the wiper plate being slidable upon the bar between the end portions so that movement of the wiper plate from the magnetic section to the non-magnetic section effects removal of metal cuttings from the bar by pushing the metal cuttings from the outer surface of the bar next to the magnetic section to the outer surface of the bar next to the non-magnetic section;
   e) one or more handles on the wiper plate that enable a user to manipulate said assembly; and
   f) wherein at least one of said handles is in a peripheral portion of the wiper plate.

2. Apparatus for removing metal cuttings from oil well drilling mud of claim 1 wherein at least one of the end plates is of a non-magnetic material.

3. Apparatus for removing metal cuttings from oil well drilling mud of claim 1 wherein each of the end plates is of a non-magnetic material.

4. Apparatus for removing metal cuttings from oil well drilling mud of claim 1 wherein the wiper plate is of a polymeric material.

5. Apparatus for removing metal cuttings from oil well drilling mud of claim 1 wherein the wiper plate is of a plastic material.

6. Apparatus for removing metal cuttings from oil well drilling mud of claim 1 wherein the wiper plate is of a non-metallic material.

7. Apparatus for removing metal cuttings from oil well drilling mud of claim 1 wherein each end plate has one or more of said handles defined by one or more openings in between the periphery of the end plate and the outer surface of the magnetized bar.

8. Apparatus for removing metal cutting from oil from oil well drilling mud of claim 1, wherein one or more of said wiper plate handles are defined by openings in between the wiper plate periphery and the outer surface of the magnetized bar.

9. Apparatus for removing metal cuttings from oil well drilling mud of claim 1 wherein an end portion of the bar next to the second end plate is not magnetized.

10. Apparatus for removing metal cuttings from oil well drilling mud of claim 1 wherein the bar has a pin at one end portion and the second end plate is removably attached to the bar with the pin.

11. Apparatus for removing metal cuttings from oil well drilling mud of claim 10 wherein the pin has a pin opening and further comprising a locking member that secures the second end plate to the pin at the pin opening.

12. Apparatus for removing metal cuttings from oil well drilling mud of claim 1 further comprising a container that is sized and shaped to contain the magnetized bar and plates.

13. Apparatus for removing metal cuttings from a flowing stream of liquid oil well drilling mud, comprising:
   a) an elongated member having a first end portion, a second end portion, an outer surface, a magnetized section and a non-magnetic section;

b) wherein the non-magnetic section is joined to the magnetic section at a location that is in between the said first and second ends;

c) a plate attached to each of said elongated member end portions, each plate having a peripheral portion that extends radially away from said outer surface of said elongated member;

d) a non-magnetic wiper plate having a central opening that conforms to the outer surface of the magnetized member, and the wiper plate and magnetized member defining an assembly and wherein the wiper plate has a peripheral portion that extends radially away from said central opening, the wiper plate being slidable upon the magnetized member;

e) wherein said elongated member and said plates form an assembly;

f) wherein movement of the wiper plate from the first end to the second end enables removal of metal cuttings from the magnetized section of the elongated member when the wiper plate and cuttings travel from the magnetic section to the non-magnetic section; and g) wherein one of said plates has at least one opening in said peripheral portion and spaced laterally away from the outer surface of the elongated member, said opening being sized and shaped to receive the hand of a human technician when the technician handles the said assembly.

14. The apparatus for removing metal cuttings from oil well drilling mud of claim 13 wherein at least one end plate is attached to an end portion of the member, and wherein said end plate is of a non-magnetic material.

15. The apparatus for removing metal cuttings from oil well drilling mud of claim 14 wherein each of the end plates is of a non-magnetic material.

16. The apparatus for removing metal cuttings from oil well drilling mud of claim 14 wherein both of the end plates have one or more openings in the peripheral portion of the end plate and spaced laterally away from the magnetized member.

17. The apparatus for removing metal cuttings from oil well drilling mud of claim 14 wherein the elongated member has a pin at one end portion and one end plate is removably attachable to the elongated member at the pin.

18. The apparatus for removing metal cuttings from oil well drilling mud of claim 13 wherein the wiper plate is of a polymeric material.

19. The apparatus for removing metal cuttings from oil well drilling mud of claim 13 wherein the wiper plate is of a plastic material.

20. The apparatus for removing metal cuttings from oil well drilling mud of claim 13 wherein the wiper plate is of a non-metallic material.

21. The apparatus for removing metal cuttings from oil well drilling mud of claim 13 wherein the wiper plate has one or more openings in the peripheral portion and spaced laterally from the outer surface of the elongated member.

22. The apparatus for removing metal cuttings from oil well drilling mud of claim 13 wherein the magnetized member has a length, and a majority of the length of the magnetized member is magnetic, a minority of the length being non-magnetic.

23. The apparatus for removing metal cuttings from oil well drilling mud of claim 22 wherein the non-magnetic section spaced is in between the end plates.

* * * * *